May 20, 1930. J. DANIEL 1,759,808
AUTOMATIC CONTROL FOR CONCRETE MIXING MACHINES
Filed Feb. 7, 1929 3 Sheets-Sheet 1

Inventor
John Daniel
By Robbt Robb
Attorneys

May 20, 1930.  J. DANIEL  1,759,808
AUTOMATIC CONTROL FOR CONCRETE MIXING MACHINES
Filed Feb. 7, 1929  3 Sheets-Sheet 2
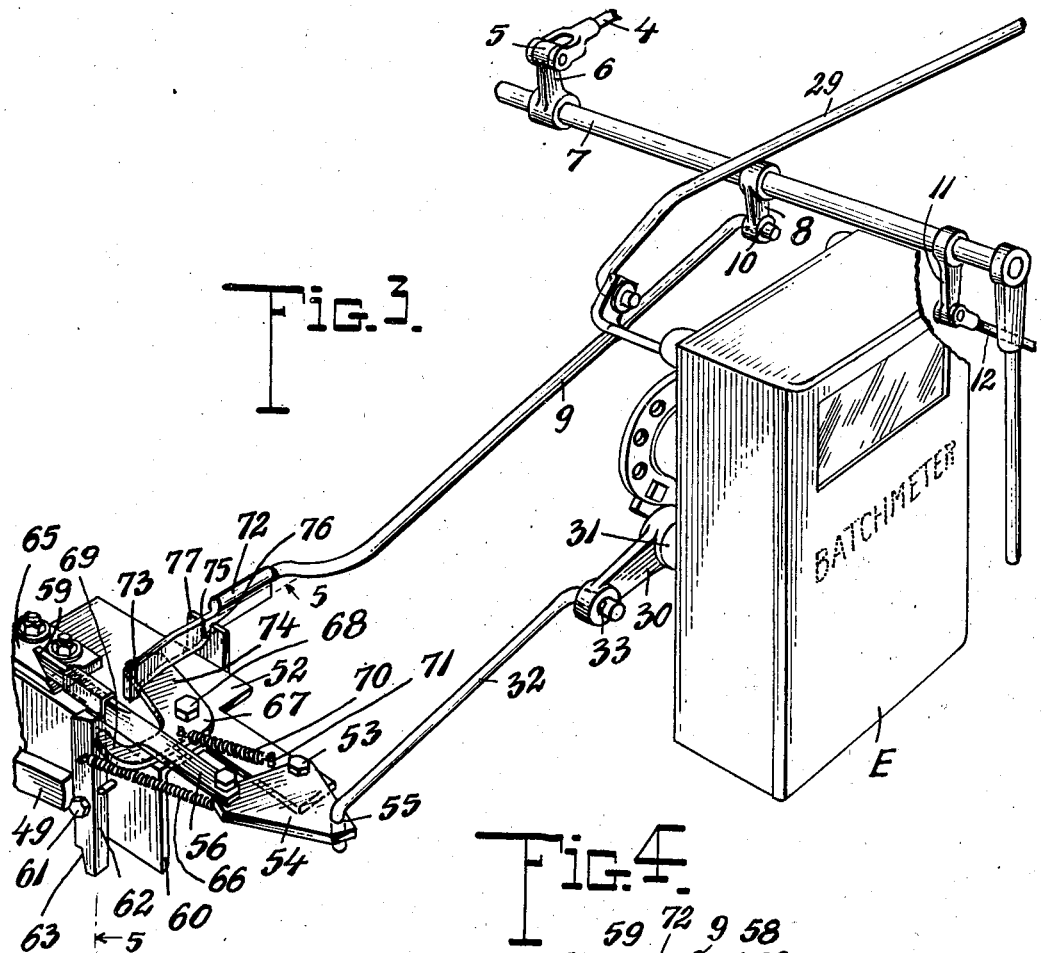
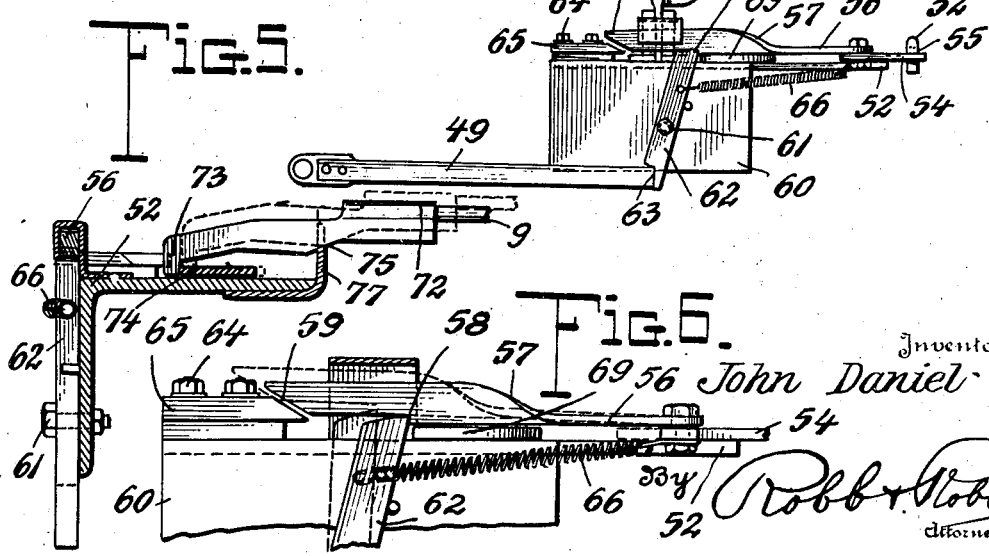
Inventor
John Daniel
By Robb & Robb
Attorneys

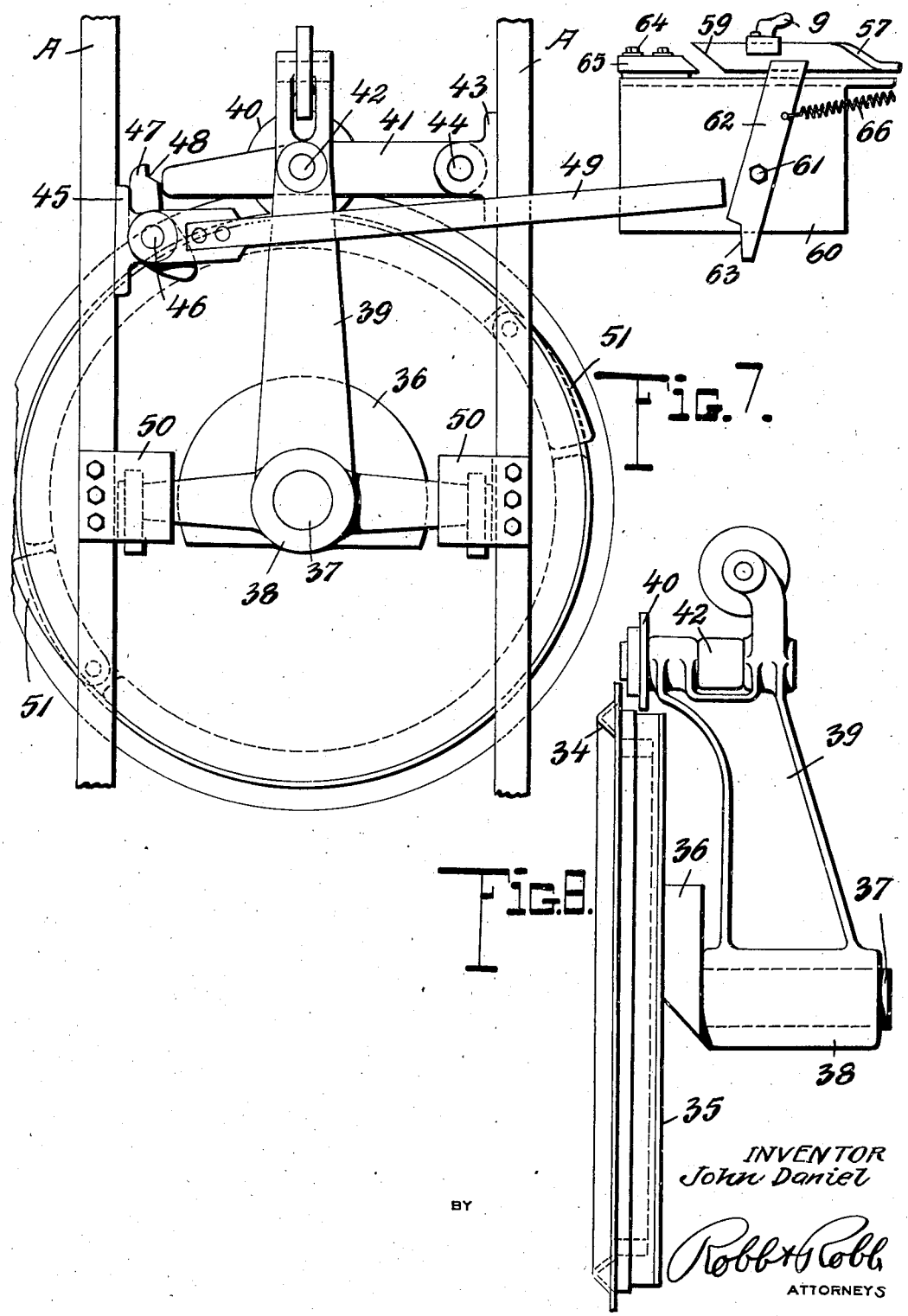

Patented May 20, 1930

1,759,808

UNITED STATES PATENT OFFICE

JOHN DANIEL, OF MILWAUKEE, WISCONSIN, ASSIGNOR TO KOEHRING COMPANY, OF MILWAUKEE, WISCONSIN, A CORPORATION

AUTOMATIC CONTROL FOR CONCRETE-MIXING MACHINES

Application filed February 7, 1929. Serial No. 338,147.

This invention has to do with concrete mixing machines, and involves primarily the provision of certain novel control instrumentalities for automatically causing the operations of certain mechanisms constituting the machine.

The parts of a paving machine with which this invention is particularly related, are the loading skip, water supply means, batchmeter, discharge chute, and of course the mixing drum. In the present instance the control instrumentalities are peculiarly designed for cooperation with a discharge chute of the rotary type, that is, one that rotates in its movements from discharging to mixing positions, and vice versa.

An object of the invention is to provide automatic control means for interrelating the operations of the discharge chute and water supply mechanism so that simultaneously with the starting of the flow of water to the mixing drum, the discharge chute will be moved to mixing position. Inasmuch as the operation of the water supply mechanism is associated with that of the charging skip, this involves an association of the operation of these three parts.

Another object of the invention is to provide control instrumentalities which are affected by the batchmeter to cause movement of the discharge chute mechanism at the termination of the mixing period, to discharging position. These same control instrumentalities which are designed to be affected by the batchmeter to cause the discharge chute to assume a discharging position are also affected by the loading skip in its upward movement to cause the discharge chute to be moved to the mixing position simultaneously with the initiation of the flow of water to the mixing drum.

Particular features of the invention lie in the detail construction of the novel control instrumentalities, the connections between these instrumentalities and the discharge chute, batchmeter, water supply means, and loading skip.

With these and other objects in view as will in part become apparent and in part be hereinafter stated, the invention comprises certain novel constructions, combinations and arrangements of parts as will be subsequently specified and claimed.

For a full and more complete understanding of the invention, reference may be had to the following description and accompanying drawings, in which—

Figure 3 is a view similar to Figure 2, showing the control instrumentalities just after being set off by the batchmeter.

Figure 4 is a view in front elevation of the control instrumentalities.

Figure 5 is a section through the control instrumentalities taken about on the line 5—5 of Figure 3.

Figure 6 is an enlarged detail showing of a certain portion of the control instrumentalities, bringing out particularly the manner of tripping the discharge chute.

Figure 7 is a view somewhat diagrammatic, of the rotary discharge chute, and develops the connection between the latter and the control instrumentalities, and Figure 8 is a view in side elevation, somewhat diagrammatic, showing the rotary discharge chute by itself.

Figure 1:
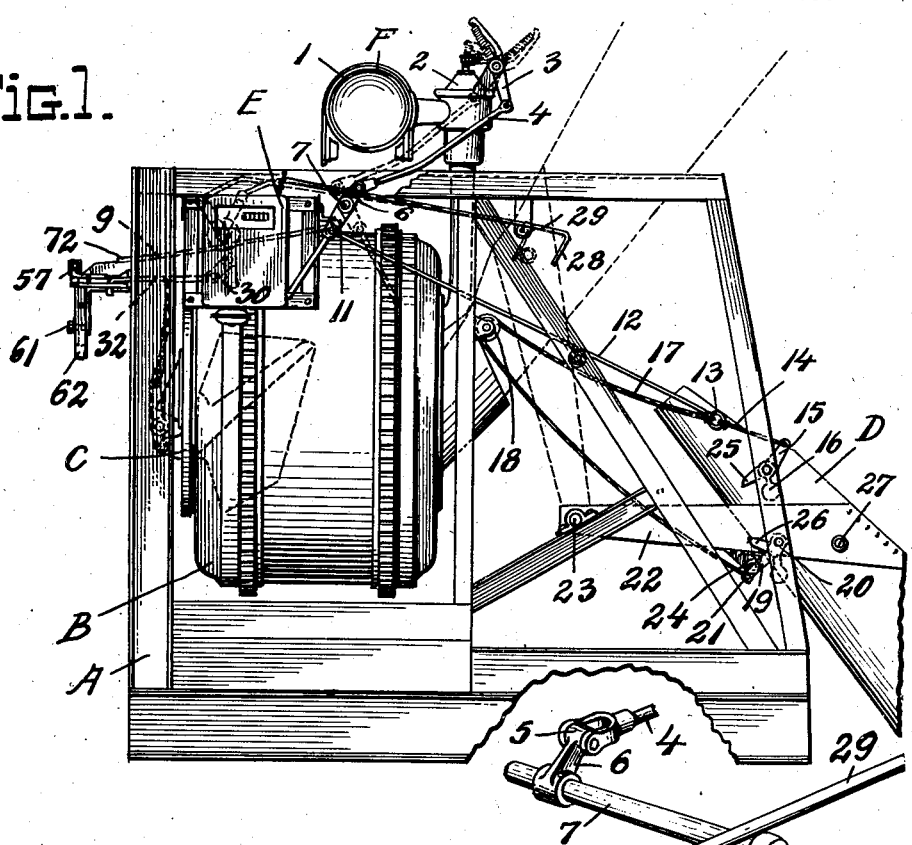
Figure 1 is a view in side elevation, somewhat diagrammatic, of that portion of a batchmeter with which my invention is particularly related, parts being broken away.
Figure 2:
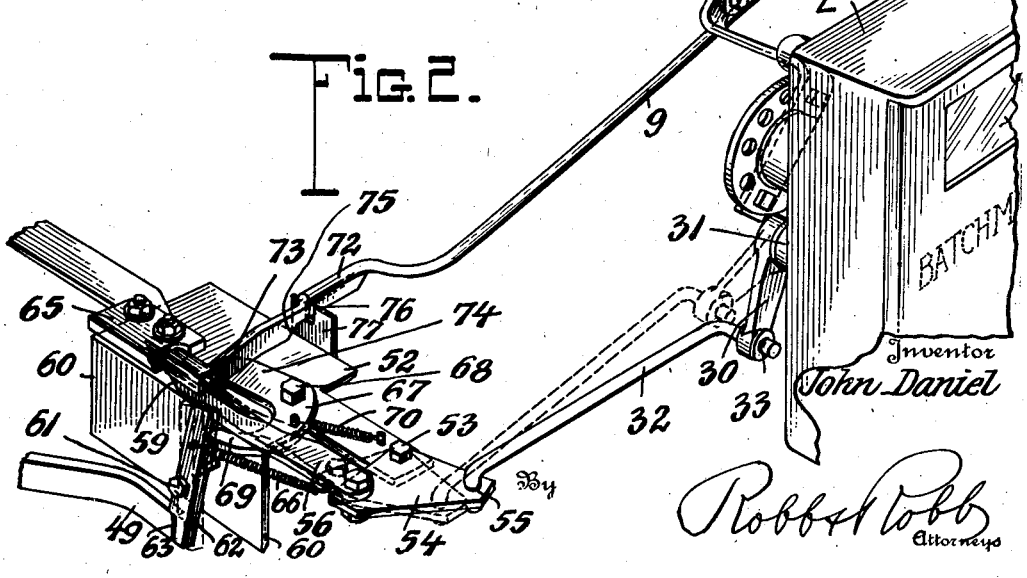
Figure 2 is a detail view in perspective of the novel control instrumentalities provided by this invention, and illustrates somewhat diagrammatically, connections between these instrumentalities and the batchmeter, water supply means, and rotary discharge chute. This view shows the control instrumentalities just prior to being set off by the batchmeter.

While a preferred specific embodiment of the invention is here shown, it is to be understood that I am not to be limited to the exact constructions and illustrations because various modifications of these details may be provided in putting the invention into practice within the purview of the appended claims.

Throughout the following description and various figures of the drawings, like reference characters denote corresponding parts.

The drawings show only that part of the mixing machine which is particularly associated with this invention. These various mechanisms are mounted on the framework A and comprise a mixing drum B which is constantly rotated from a power source (not shown), a discharge mechanism referred to generally by the reference character C, loading skip D, batchmeter E, and water supply means F.

The water supply mechanism F comprises a water measuring tank 1 and a three-way valve designated 2, which controls the inflow to and outflow from the tank 1. This three-way valve is of a well known type and functions to either cause a filling of the tank 1 from a main water supply line, or a discharge of the contents of the tank 1 into mixing drum B. The three-way valve mechanism includes an operating arm 3 to which is fastened a link 4. The other end of the link 4 is fastened by a pivotal connection shown at 5 to one end of an arm 6 extending from a shaft 7. The shaft 7 is suitably mounted on the framework of the machine A and carries an arm 8 to which is connected a rod 9 by the connection shown at 10, which rod 9 leads to the control instrumentalities to be hereinafter more fully described. Another arm 11 is outstanding from the shaft 7 and to this arm is connected a rod 12, which member is adapted to be affected by movement of the loading skip to rock the shaft 7 to control the operation of the water supply mechanism F and the automatic control instrumentalities.

The other end of the link 12 terminates in a sort of eyelet construction designated 13, and connected thereto is a cable 14 which is also connected to an arm 15 of a bell crank 16. Another line or cable 17 is connected to the eyelet 13 and passes over a sheave 18 and is connected to an arm 19 of a bell crank 20 as shown at 21. The charging skip D is mounted between the arms 22 which are pivoted to the framework A as shown at 23. One of the arms 22 carries a roller abutment member 24 which is designed to strike against either of arms 25 or 26 of the bell cranks 16 and 20 in upward or downward movement of the skip, to actuate said bell cranks, whereby either a movement in one direction or the other is imparted to the rod 12.

One of the arms 22 also carries an abutment member 27 which is adapted to engage the turned over end 28 of a rod 29 which rod leads to the batchmeter E just before the skip D reaches a position wherein its contents are charged into the mixing drum as shown by dotted lines in Figure 1. This engagement of the member 27 with the rod 29 causes an inward actuation of the latter to set the batchmeter at the moment when the mixing period for a batch of concrete actually commences, namely when the aggregates are charged into the mixing drum B.

The batchmeter E may be of one of the mechanisms now known in the art, which functions to determine the mixing period of a batch of concrete in the mixing drum B. It is customary to have the batchmeter sound an audible signal upon the termination of the mixing period, and this practice need not be departed from in this invention. I also provide the batchmeter with mechanism which will cause an actuation of an arm 30 which is pivotally mounted in the batchmeter as shown at 31, and to the free end of which is connected a link 32, which connection is pivotal as shown at 33. The link 32 runs to the control instrumentalities to be hereinafter described.

The discharge chute mechanism in the present instance is shown as of the rotary type, and such a mechanism readily lends itself to association with my control instrumentalities, but it is to be remembered that other forms of discharge mechanism might well be availed of. This rotary discharge chute mechanism comprises a ring member 34 which is bolted to the mixing drum B around the discharge opening thereof. A plate 35 carries a discharge chute which may be of any well known construction. In the present instance, I have shown one that is designed, when it is in a mixing position, to aid in the mixing operations in the mixing drum, and when in a discharging position, discharges the aggregates from the drum. A bracket 36 extends outwardly from the plate 35 and carries a pin 37. The pin 37 is journaled in the hub portion 38 of a bracket 39, which bracket also has pivotally mounted thereon, a roller 40. An arm 41 is pivoted intermediate its ends as shown at 42 to the bracket 39 and this arm at one end is pivoted to a plate 43 as shown at 44, which plate 43 is mounted on the framework A of the machine.

The framework A also carries a plate 45 to which is pivoted at 46 a latch member 47 having a notch in one end thereof as shown at 48. The free end of the arm 41 is shaped so that it is complemental to the notch 48 and it is noted that the two, when in engagement, afford a sort of cam arrangement. To one end of the latch member 47 is fastened an arm 49 which arm leads to the control instrumentalities, to be hereinafter described, and is affected by the latter.

The framework A of the machine has bolted thereto, plates 50 which serve as guides for the rotary discharge chute mechanism.

It is noted that when the arm 49 is held in position by the automatic control instrumentalities, wherein the end of the arm 41 engages notch 48 of the latch member 47, the rotary discharge chute mechanism is maintained suspended from the bracket 39 and in this position it is out of contact with ring 34 carried by the mixing drum. However, should the control instrumentalities be operated to permit the arm 49 to move upwardly, then the weight of the rotary discharge chute mechanism will cause the arm 41 to move downwardly. This movement, due to the cam arrangement of the notch 48, causes a movement to the left of the latch member 47 and an upward movement of the arm 49. This downward movement of the discharge chute mechanism causes an engagement of the latter with the mixing drum of the machine whereby the discharging chute is rotated due to the rotating action of the drum. This rotation takes place until one of the cam members 51 (there being two of these members diametrically oppositely disposed) engages the roller 40 to lift the discharge chute mechanism. This upward movement of the mechanism will cause a re-engagement of the free end of the arm 49 with the notch 48 and cause the arm 49 to again move into position where it is controlled by the control instrumentalities.

The control instrumentalities comprise a plate 52 which may be affixed to the framework A in any preferred manner. At one end of the plate 52 and pivoted thereto at 53, is a bell crank 54. The bell crank 54 has one end of the link 32 connected thereto as shown at 55. A bar 56 is also connected to the bell crank 54 and this bar is twisted intermediate its ends as indicated at 57 and is provided with a shoulder 58 and cammed end 59.

The plate 52 is of a bent-over construction as clearly shown in Figure 3, and includes a downwardly extending flange portion 60. Pivotally mounted at 61 on the flange 60 is a latch member 62, one end of which is provided with a notch as shown at 63. The notch 63 of the latch member 62 is adapted to engage the end of the arm 49 to maintain the discharge chute mechanism in either its mixing or discharging position, as the case may be. The upper end of the latch member 62 is at certain times in engagement with the shoulder 58 of the bar 56.

The plate 52 has affixed thereto as shown at 64, a cam member 65 which is designed for cooperation with the cammed end 59 of the bar 56. When the latter is moved under the action of the batchmeter, it causes a shifting of the latch member 63 to release the arm 49 and the cammed end 59 of the bar 56 causes a disengagement of the shoulder 58 from the latch 62 whereby the latter may be moved under the influence of a spring 66. The spring 66 has one end fastened to the latch 62 and the other end is made fast to the bell crank 54.

A bell crank 67 is pivoted to the plate 52 at 68. One end of this bell crank is curved as shown at 69 and is adapted to engage the latch 62. A spring 70, which is anchored to the plate 52 at 71, has one end fastened to the arm 69 of the bell crank 67 and normally holds this arm back out of engagement with the latch 62. The rod 9 terminates in a cam plate 72 which has at one end a hook member 73 that is adapted to engage arm 74 of the bell crank 67. Cam plate 72 also is formed with a cam 75 which is designed to cooperate with the edge of a notch 76 formed in a plate 77. The notch 76 also functions as a guide means for the plate 72 in its movement. It is obvious that a pull on the rod 9 will cause a movement of the bell crank 67 whereby the arm 69 engages the latch 62 to cause a disengagement of the latter from the arm 49.

The operation of the control instrumentalities will be described by developing the association of the various parts of the machine therewith. Assume that the batch of aggregates is in the mixing drum which is rotated, and the discharge chute is in mixing position. At the termination of the mixing period, the batchmeter E may sound an audible signal to indicate that the mixing period is terminated. Coincident with the termination of this mixing period, the batchmeter will cause the link 32 to be actuated, which movement is imparted through the bell crank 54 to the bar 56. The bar 56, by movement to the left (this movement being the same in all the figures of the drawings), causes the latch 62, which is in engagement with the shoulder 58, to be shifted to disengage the notch 63 from the end of the arm 49. This disengagement permits of upward movement of the latter which allows the discharge chute to assume a discharging position. Movement to the left of the bar 56 causes disengagement of the shoulder 58 from the latch 62 due to the cammed construction 59 and 65, and the latch 62 may be moved back into its normal position under the influence of the spring 66.

When the discharge chute has assumed the discharging position, the cam 51 will have moved the mechanism upwardly to cause the discharge chute to remain in this discharging position. Under this condition, the arm 49 will be moved downwardly under its own weight to again engage the notch 63 in the latch 62 and the discharge chute will be maintained in the discharging position until the latch 62 is again operated to release the arm 49.

The operator of the machine now initiates upward movement of the skip D to charge a fresh batch of aggregates into the mixing drum B. In the early part of this upward movement of the skip D, the projection 24 engages the arm 25 of the bell crank 16 to shift the rod 12 whereby the shaft 7 is rocked. The rocking of this shaft 7 through the connections 3, 4, 5 and 6, actuates the three-way valve mechanism 2 to initiate the flow of water to the mixing drum. At the same time, the rod 9 is moved to the right, which action causes the hooked end 73 to actuate the bell crank 67, whereby the arm 69 moves the latch 62 to disengage the latter from the arm 49 to cause the discharge chute to assume a mixing position. The cam 75 and plate 77 cause a disengagement of the hook 72 from the bell crank 67 whereby the latter is actuated under the influence of the spring 70. One of the cams 51 will raise the discharge chute mechanism in the manner hereinbefore described, to cause one end of the arm 49 to again engage the latch 62 which has been moved to its locking position under the action of the spring 66.

Upon the skip D reaching its uppermost or charging position, the abutment member 27, through the rod 29, causes a setting of the batchmeter. When the skip is lowered, the abutment 24 will engage arm 26 of the bell crank 20, which action, through the cable 17 and link 12, causes a shifting of the shaft 7 to operate the three-way valve 2 to cut off the supply of water to the mixing drum and permit the measuring tank to be filled from the main supply line. This last mentioned action in no way affects the control instrumentalities with the exception that the rod 9 is shifted to move the plate 72 to a position wherein the hook member 73 again engages the arm 74 of the bell crank 67.

Having thus described my invention, what I claim as new and desire to secure by Letters Patent of the United States, is:—

1. In a concrete mixing machine of the class described, the combination, with a mixing drum, of a discharge chute for discharging aggregates from the mixing drum and a loading skip for charging aggregates into the drum, a water supply means for supplying quantities of water to the mixing drum, and control instrumentalities associated with the discharge chute, water supply means, and loading skip including a device for causing the discharge chute to assume a mixing position simultaneously with the initiation of the flow of water from the water supply means to the mixing drum, said device also causing said flow of water to take place during the passage of the aggregates from the skip into the drum and during lowering movement of the skip.

2. In a concrete mixing machine of the class described, the combination, with a mixing drum, a skip for charging aggregates into the drum, a discharge chute for discharging mixed concrete from the drum, and a water supply means for supplying water to the drum, of control instrumentalities, and connections between the control instrumentalities and the charging skip discharge chute and water supply means, and including a device whereby movement of the said skip into a charging position causes initiation of flow of water into the mixing drum and at the same time affects the control instrumentalities to cause the discharge chute to assume a non-discharging position, movement of the skip to a loading position affecting the control instrumentalities to discontinue the flow of water to the drum.

3. In a concrete mixing machine of the class described, the combination, with a mixing drum, charging means for the drum, a discharge chute for discharging mixed concrete from the drum, and a batchmeter for determining the mixing period of aggregates in the mixing drum, of control instrumentalities associated with the discharge chute for controlling the action of the same, connections between the control instrumentalities and the batchmeter, operation of the batchmeter at the termination of a mixing period actuating the control instrumentalities to move the chute into a discharging position, and connections between the control instrumentalities and the charging means whereby the former are actuated to cause the discharge chute to assume a non-discharging position at the beginning of movement of the latter to assume a charging position.

4. In a concrete mixing machine of the class described, the combination, with a mixing drum, a skip for charging aggregates into the drum, a discharge chute for discharging mixed concrete from the drum, and a water supply means for supplying water to the drum, of control instrumentalities, and connections between the control instrumentalities, the discharge chute, the charging skip and water supply means, movement of the said skip into a charging position actuating the control instrumentalities to in turn initiate flow of water into the mixing drum and at the same time affecting the control instrumentalities to cause the discharge chute to assume a non-discharging position, and movement of the skip from charging position to a lowered position on the ground causes actuation of the control instrumentalities to discontinue the supply of water to the drum, but which movement has no effect on the discharge chute.

5. In a concrete mixing machine of the class described, the combination, with a mixing drum, charging means therefor, discharging means therefor, a batchmeter for determining the mixing period of a batch of aggregates in the drum, and water supply means for supplying water to the drum, of control instrumentalities associated with the discharge means for controlling action of the same, connections between the control instrumentalities and the batchmeter whereby the latter affects the control instrumentalities at the termination of a mixing period of a batch of concrete in the drum the control instrumentalities in turn moving the discharge means to a discharging position, and connections between the loading skip, water supply means and control instrumentalities whereby movement of the skip into a charging position affects the control instrumentalities to cause the discharge means to assume a mixing position and simultaneously operate the water supply means to cause flow of water to the mixing drum.

6. In a concrete mixing machine of the class described, the combination, with a mixing drum, a skip for charging aggregates into the drum, a discharge chute for discharging mixed concrete from the drum, and a water supply means for supplying water to the drum, of control instrumentalities, and connections between the control instrumentalities, the discharge chute, the charging skip and water supply means, whereby movement of the said skip into a charging position causes initiation of flow of water into the mixing drum and at the same time affects the control instrumentalities to cause the discharge chute to assume a non-discharging position, and movement of the skip from charging position to a lowered position on the ground causes actuation of the water supply means to discontinue the supply of water to the drum, and which movement causes a resetting of the control instrumentalities but does not affect the discharge chute.

7. Control instrumentalities for concrete mixers of the class described, comprising, in combination, a plate adapted to be mounted on the framework of a mixing machine, a latch carried by the plate adapted to engage the operating member of a discharge chute mechanism, means for affecting the latch of the batchmeter by a mixing machine to effect shifting of the discharge means of the mixer, and supplemental means for affecting the latch to cause shifting of the discharge mechanism, said last named action being caused by movement of the loading skip of the machine.

8. Automatic control mechanism of the class described, comprising, in combination, a flange plate adapted to be mounted on the framework of a paving machine, a latch carried by said flange plate adapted for engagement with the control arm of a rotary discharge chute mechanism, a bell crank carried by the plate, connections between the bell crank and the batchmeter, connections between the bell crank and the latch whereby the batchmeter may cause actuation of the latter, and means for causing disengagement between the bell crank and the latch.

9. Automatic control mechanism of the class described, comprising, in combination, a flange plate adapted to be mounted on the framework of a paving machine, a latch carried by said flange plate adapted for engagement with the control arm of a rotary discharge chute mechanism, a bell crank carried by the plate, connections between the bell crank and the batchmeter, connections between the bell crank and the latch whereby the batchmeter may cause actuation of the latter, means for causing disengagement between the bell crank and the latch, and means for restoring the latch to its normal position.

10. Automatic control instrumentalities for controlling the operation of a rotary discharge chute, comprising, in combination, a main body member, a latch pivotally mounted on said body member and adapted to normally engage the operating member of a rotary discharge chute mechanism, a bell crank pivotally mounted on said plate and having an arm adapted to engage the latch, a connection between the said bell crank and the charging skip of a mixing machine, and means for causing disengagement of said last named connection.

11. Automatic control instrumentalities for controlling the operation of a rotary discharge chute, comprising, in combination, a main body member, a latch pivotally mounted on said body member and adapted to normally engage the operating member of a rotary discharge chute mechanism, a bell crank pivotally mounted on said plate and having an arm adapted to engage the latch, a connection between the said bell crank and the charging skip of a mixing machine, means for causing disengagement of said last named connection, and means for normally holding the bell crank in a position wherein it does not affect the latch.

12. Automatic control instrumentalities for controlling the operation of a rotary discharge chute, comprising, in combination, a main body member, a latch pivotally mounted on said body member and adapted to normally engage the operating member of a rotary discharge chute mechanism, a bell crank pivotally mounted on said plate and having an arm adapted to engage the latch, a connection between the said bell crank and the charging skip of a mixing machine, means for causing disengagement of said last named connection, and means for restoring the latch to its normal position wherein it holds the operating member of the discharge chute mechanism against movement.

13. Control instrumentalities of the class described, comprising, in combination, a main body member, a latch pivotally mounted on the main body member and adapted to engage and hold the operating member of a rotary discharge chute mechanism against movement, means for causing disengagement of said latch from the discharge chute operating member, connections between said last named means and the batchmeter, and means actuated by movement of the loading skip causing disengagement of the latch from the discharge chute operating member.

14. Control instrumentalities of the class described, comprising, in combination, a main body member, a latch pivotally mounted on the main body member and adapted to engage and hold the operating member of a rotary discharge chute mechanism against movement, means for causing disengagement of said latch from the discharge chute operating member, connections between said last named means and the batchmeter, means actuated by movement of the loading skip causing disengagement of the latch from the discharge chute operating member, and a spring normally holding the latch in engagement with the discharge chute operating member.

15. Control instrumentalities of the class described, comprising, in combination, a flange plate adapted to be mounted on the framework of a mixing machine, a latch member pivoted to the flange of the plate and having a notch portion which engages the operating member of a rotary discharge chute mechanism, a bell crank pivotally mounted on the flange plate, a connection between the bell crank and a batchmeter of the mixing machine on which the instrumentalities are mounted, means associated with the bell crank for affecting the latch member to cause disengagement of the discharge chute operating arm therefrom, a second bell crank pivotally mounted on the flange plate and having an arm adapted to engage the latch member, and means for actuating said second bell crank coincident with the initiation of the flow of water to the mixing drum of a machine.

In testimony whereof I affix my signature.
JOHN DANIEL.